April 7, 1959 H. ERNYEI 2,881,394

GRID MODULATING A TELEVISION TRANSMITTER BY SUCCESSIVE MODULATION OF CARRIER IN PLURAL STAGES

Filed Dec. 2, 1953 2 Sheets-Sheet 1

Inventor
Herbert Ernyei
By Ralph B. Stewart
Attorney

Inventor
Herbert Ernyei
By Ralph B. Stewart
Attorney

United States Patent Office 2,881,394

Patented Apr. 7, 1959

2,881,394

GRID MODULATING A TELEVISION TRANSMITTER BY SUCCESSIVE MODULATION OF CARRIER IN PLURAL STAGES

Herbert Ernyei, Paris, France, assignor to Societe Nouvelle de l'Outillage R.B.V. et de la Radio-Industrie (R.B.V.-R.I.), Paris, France, a joint-stock company Application December 2, 1953, Serial No. 395,727

Claims priority, application France December 5, 1952

3 Claims. (Cl. 332—41)

The present invention is concerned with modulating a television transmitter. As is well known, the video signal which is to be transmitted is a very complex electrical signal, made of different parts as shown on Figure 1. Between levels A and C is situated the modulating signal which reproduces the brightness variations of one line of the scanned picture. Beneath level A are introduced controlling recurrent pulses for synchronising the scanning at the television receiver. To obtain a good picture, it is necessary that both the modulating video signal and the synchronising pulses should be transmitted without distortion. Level A is to be accurately transmitted since it gives a reference level both for the picture and for the synchronising pulse separation at the receiver.

Figure 1 shows a television signal according to the French Standard, that is to say, level A corresponds to the black level of the picture and the synchronising pulses are blacker than black. It is the contrary for U.S. television signal but the problem of modulating linearly a transmitter between levels C and B remains the same with the necessity of transmitting a D.C. component of the video signal so as to obtain an accurate transmission of level A.

When dealing with high power transmitters, the yield or output of the whole equipment is important. It is therefore usual to grid modulate high power transmitters as class B or C radiofrequency amplifiers. To obtain a linear modulation and transmit a D.C. component, it is necessary to modulate a class A radio frequency amplifier, and the output of such transmitter would be very low.

It is an object of the present invention to provide means for linearly grid modulating a high power transmitter with an improved output.

It is another object of the invention to modulate different power levels of a radio frequency channel by means of several signals which extend over limited frequency bands overlapping each other.

It is another object of the invention to modulate low power class A radio frequency amplifiers according to the low frequency components of a television signal and to modulate medium and high power radio frequency class B amplifiers according to the high frequency components of the video signal.

It is another object of the invention to provide filtering means for dividing a large frequency spectrum beginning at zero frequency between several overlapping sub-spectra through independent video channels the frequency bands of which are much larger than the bandwidth of each sub-spectrum.

It is another object of the invention to provide a frequency filtering means which divides a frequency band into overlapping sub-bands so that the phase distortion at the limit of two adjacent sub-bands should remain within a very small value.

According to the invention, the video signal is divided at least in two components by means of a frequency sensitive filter, said components modulating separately the radio frequency channel at different power levels on this channel, the selective characteristics of each output circuit of said filtering means overlapping so that the amplitude attenuation with respect to the maximum amplitude corresponding to full transmission is 3 db for the frequency range between 0.75 mc. and 2.5 mcs. on each side of an intermediate frequency in the middle of said overlapping fraction of two adjacent frequency sub-bands. The low video frequency components modulate low power, class A radio frequency amplifiers while the highest video frequency components of the video signal modulate the power class B amplifier, and intermediate video frequency modulate class A or B medium power amplifiers.

The invention will be readily understood by reference to the following description and the accompanying drawings.

As was said,

Figure 2:
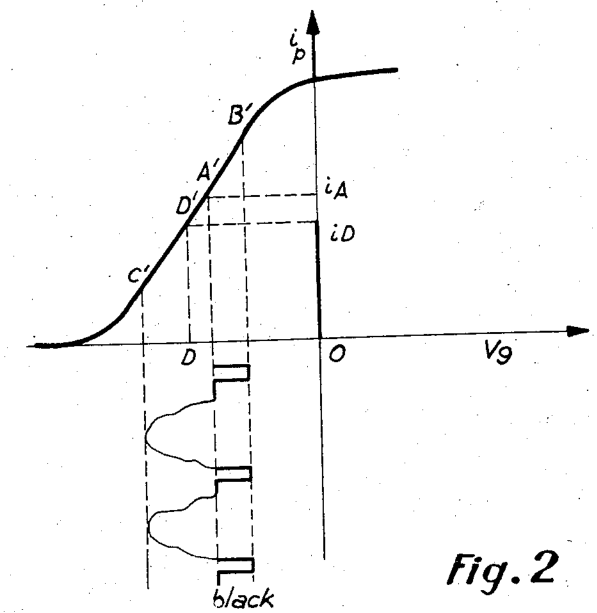
Figure 2 shows the characteristic of a class A amplifier so as to allow understanding of the conditions which should be followed by a distortionless modulating stage.

As was said, grid modulation is usual practice when good linearity is required. It is therefore necessary that the grid plate characteristic of the modulated amplifier should be absolutely linear between levels B and C. As shown on Figure 2, this is usually not possible, even for class A amplifier, owing to the large amplitude difference between levels B and C unless a much higher power stage than strictly required is used. It is possible to correct the amplitude distortion due to the small curvature of the characteristic at C′ by a predistortion of the video signal. This correction is based on the assumption that the modulating signal will always lie between B′ and C′ on the characteristic. However, it is often necessary, in a television transmitter, to be able to change the black level, that is to say to use a modulating signal in which reference level A may be displaced, for instance, from A′ to D′. In this case, the whole signal is displaced on the characteristic of the amplifier and the curvature for positive peaks of the signal is not the same any more, so that the predistortion does not correspond to the actual distortion which occurs during modulation.

On the other hand, black level A corresponds to the D.C. component of the output current of the amplifier shown as $i_A$ or $i_D$ which is very large for high power amplifier, that is to say that the power consumption of the modulated amplifier is very high mainly because of the necessity of working in class A, that is to say the necessity of transmitting the D.C. component of the modulating signal.

According to the invention, the D.C. component and the low frequency components of the video signal are used to grid modulate a low power class A radio frequency amplifier while the A.C. components of the video signal grid modulate higher power class B radio frequency amplifiers.

Figure 1:
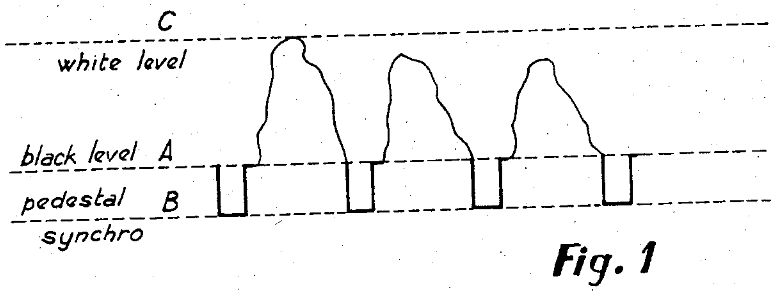
Figure 1 shows the type of video signals which should be transmitted without either amplitude or phase distortion.
Figure 3:
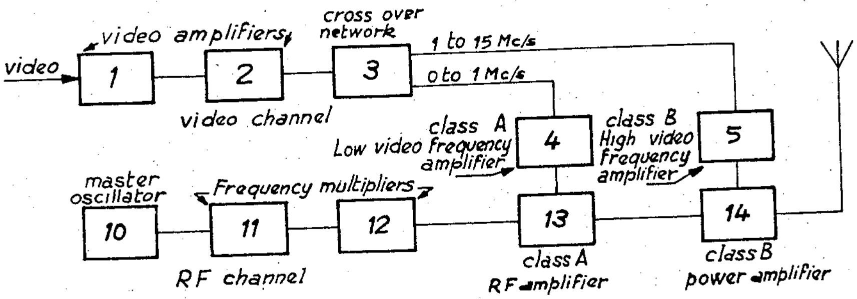

Figure 3 shows the different circuits used to modulate a television transmitter according to the invention. As shown, 1 and 2 are video amplifiers which deliver a signal such as shown on Figure 1 to the filtering unit 3. Detailed description of filtering unit 3 is made in accordance with Figure 4. According to French television standards, the frequency band of the video signal extends from 0 to 15 mcs. Filtering unit 3 has two outputs delivering respectively the signal components between 0 and 1 mc. and the signal components between 1 and 15 mcs. The radio frequency channel of the transmitter comprises a master oscillator 10 of the crystal-controlled type and frequency multipliers 11 and 12. As shown, the low frequency video signal is amplified in the D.C. class A amplifier 4 which grid modulates the first radio frequency amplifying stage of radio frequency amplifier 13. The highest frequency components of the video signal are amplified in channel 5 which does not transmit the D.C. component and grid modulates the power radio frequency stage 14. Amplifier 13 includes all the intermediate power stages of the radio frequency channel. They should have the frequency bandwidth corresponding to the modulated signal (0–1 mc.). Owing to the small bandwidth of the components transmitted through channel 4, this condition is easily fulfilled. Owing to the low power level of the first stage of amplifier 13, it is possible, without a too large consumption of power, to have it working as a class A amplifier that is to say a distortionless amplifier for D.C. components. As will be readily understood, the frequency bands of channels 4 and 5 should be overlapping so that not only the amplitude distortion condition should be fulfilled but also the phase distortion condition for good picture reproduction.

Figure 4:
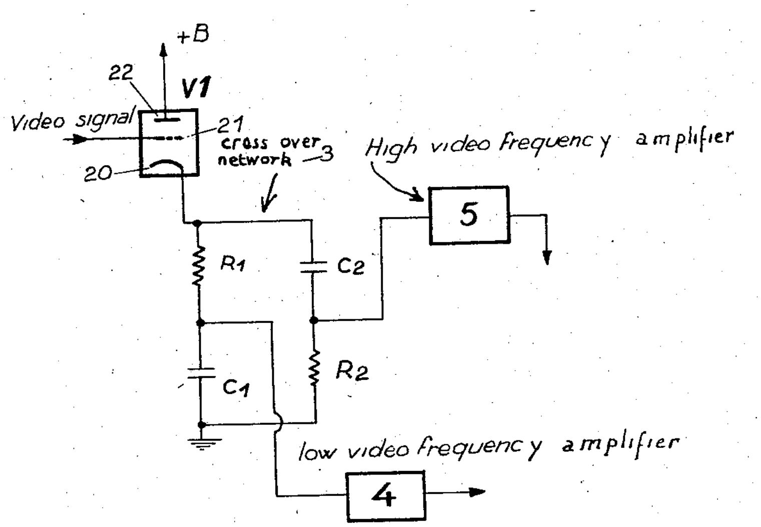

Figure 4 shows an embodiment of the filtering means 3. As appears, the filter is made of two resistor capacitor linear circuits connected in parallel in the cathode lead of the cathode follower stage $V_1$ comprising a cathode 20, a grid 21 and a plate 22 connected to the high voltage +B supply. The whole video signal is applied to grid 21. As shown, the low frequency component of the video signals are obtained at the intermediate connecting point between resistance $R_1$ and condenser $C_1$. The high frequency components are collected at the intermediate connecting point between condenser $C_2$ and resistor $R_2$. The frequency which separates two video channels (1 mc.) is actually a mean frequency of the overlapping parts of the two amplitude versus frequency curves of $R_1C_1$ on one hand and $C_2R_2$ on the other. To obtain a distortion free signal, it is necessary that this overlapping portion should extend between ±0.75 mc. and ±2.5 mcs. on each side of said mean frequency. By overlapping portion, is meant the portion of the attenuated amplitude versus frequency curves of the two filtering networks which corresponds to amplitudes higher than $$\frac{\sqrt{2}}{2}$$

times the maximum amplitude (3 db). This frequency band condition holds also for channels 4 and 5 which transmit the different parts of the video signal. In a particular embodiment of the invention, the amplitude attenuation of high video frequency amplifier 5 is 1.5 db at 0.2 mc. and attenuation of low frequency amplifier 4 and radio frequency amplifier 13 is 1.5 db at 2.5 mcs.

Figure 5:
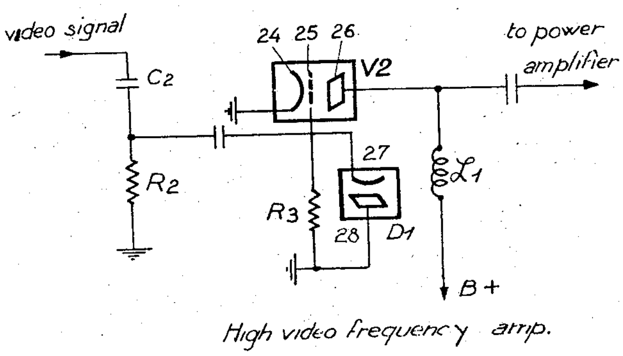

Figure 5 shows an embodiment of the high video frequency amplifier 5 according to a preferred embodiment of the invention. As shown, the high frequency components of the video signal from the connecting point between $C_2$ and $R_2$ is transmitted by means of a coupling condenser to the grid of amplifying stage $V_2$ which comprises at least a control grid 25, a grounded cathode 24, and a plate 26 connected by means of choke $L_1$ to the plate supply +B. The output from plate 26 is connected to the grid of radio frequency power amplifier 14. As shown grid 25 is grounded by means of resistor $R_3$. Diode $D_1$ is connected in parallel with resistor $R_3$ so that its cathode 26 is connected directly to the intermediate portion between grid 25 and resistor $R_3$. The anode of $D_1$ is connected at the other end of resistor $R_3$. Amplifying stage $V_2$ works as a class B amplifier. The grid bias for amplifier $V_2$ is obtained by means of diode $D_1$ connected in the input circuit of the amplifier. As is well known, the operating conditions of the tube are self adjusted (self-biassing) so that the negative peaks of the A.C. amplified signal correspond to a nearly null plate current for $V_2$. In these conditions, the D.C. consumption of amplifier $V_2$ is minimum.

What I claim is:

1. A television transmitter system comprising a radio frequency carrier-wave channel including in seriatim a carrier-wave source, a class A, low-level direct-current amplifier, a class B, medium-level amplifier and a class B power amplifier; a video signal channel including a source of video signals having a direct-current component, an amplifier for amplifying said video signals, a filtering network in said video channel for dividing the video signal spectrum in two frequency bands, one output of said filtering network delivering said direct-current component and a narrow band of frequencies at the low-frequency end of said spectrum, and another output of said filtering network delivering a high-frequency band; means for modulating said low-level class A radio frequency amplifier with said direct-current component and said low-frequency band, means for amplifying said modulated signals comprising said class B medium-level and power amplifiers, and means for modulating said class B power amplifier with said high-frequency band.

2. A television system according to claim 1 and including a class A direct-current amplifier for applying the direct-current component and the low-frequency band from said network to said carrier-wave channel, and a class B amplifier for applying the high-frequency band from said network to said power amplifier.

3. A television transmitter system comprising a radio frequency carrier-wave channel including a class A, low-level direct-current amplifier followed by a class B power amplifier, a video signal channel including a source of video signals having a direct-current component, a filtering network for dividing the video spectrum in two frequency bands, one output of said filtering network delivering the direct-current component and a narrow band of frequencies at the low-frequency end of said spectrum, and another output of said filtering network delivering a high-frequency band, means for grid-modulating said low-level class A radio frequency amplifier with said low-frequency band and direct-current component, and means for modulating said class B power amplifier with said high frequency band.

References Cited in the file of this patent

UNITED STATES PATENTS

| | | |
|---|---|---|
| 2,095,360 | Green | Oct. 12, 1937 |
| 2,206,130 | Shunack | July 2, 1940 |
| 2,537,092 | Salzberg | Jan. 9, 1951 |
| 2,549,855 | Salzberg | Apr. 24, 1951 |
| 2,568,132 | Spacek | Sept. 18, 1951 |